US010971161B1

(12) United States Patent
Vilke et al.

(10) Patent No.: US 10,971,161 B1
(45) Date of Patent: Apr. 6, 2021

(54) TECHNIQUES FOR LOSS MITIGATION OF AUDIO STREAMS

(71) Applicant: Amazon Technologies, Inc., Seattle, WA (US)

(72) Inventors: Stephen Daniel Vilke, Bainbridge Island, WA (US); David Scheiderman, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/217,618

(22) Filed: Dec. 12, 2018

(51) Int. Cl.
*G10L 19/00* (2013.01)
*G10L 19/16* (2013.01)
*H04N 21/242* (2011.01)
*H04N 21/439* (2011.01)
*H04N 19/167* (2014.01)

(52) U.S. Cl.
CPC ........ *G10L 19/0017* (2013.01); *G10L 19/167* (2013.01); *H04N 19/167* (2014.11); *H04N 21/242* (2013.01); *H04N 21/4394* (2013.01)

(58) Field of Classification Search
CPC ............. H04L 29/06027; H04L 65/601; H04L 67/1095; H04N 21/242; H04N 21/4305; G10L 19/0017; G10L 19/167
USPC .............................. 704/270.1, 227, 228, 265
See application file for complete search history.

(56) References Cited

U.S. PATENT DOCUMENTS

| 7,516,255 | B1 | 4/2009 | Hobbs |
| 7,573,886 | B1 | 8/2009 | Ono |
| 8,144,255 | B2 | 3/2012 | Hirayama et al. |
| 9,172,740 | B1 | 10/2015 | Jia et al. |
| 9,311,692 | B1 | 4/2016 | Jia et al. |
| 9,401,128 | B1 | 7/2016 | Jepsen |
| 9,620,041 | B2 | 4/2017 | Liu |
| 9,762,636 | B2 * | 9/2017 | Price ................. H04L 29/06027 |
| 10,264,070 | B2 * | 4/2019 | Bradley ............ H04L 29/06027 |
| 10,331,394 | B1 | 6/2019 | Sarfi et al. |
| 10,346,715 | B2 | 7/2019 | Makarewicz et al. |
| 10,404,963 | B1 | 9/2019 | Kenrick |
| 10,735,650 | B2 | 8/2020 | Kinoshita |

(Continued)

OTHER PUBLICATIONS

International Search Report and Written Opinion, dated Feb. 26, 2020, in International Patent Application No. PCT/US2019/066070, filed Dec. 12, 2019.

(Continued)

*Primary Examiner* — Thai Q Phan
(74) *Attorney, Agent, or Firm* — Davis Wright Tremaine LLP

(57) ABSTRACT

Systems and methods for loss protection of audio streams that may obtain an audio source such as from a microphone device, determine a sampling rate for encoding the audio source, and sampling the audio source to identify a plurality of samples (e.g., according to the sampling rate). A first audio output stream may be generated by encoding the plurality of samples. A second audio output stream may be generated by compressing each sample of the plurality of samples to collectively generate a second audio output stream. The first and second audio output streams may be transmitted (e.g., over a network subject to loss) to a recipient computer system that is able to utilize portions of the second audio output stream in place of lost portions first audio output stream.

20 Claims, 8 Drawing Sheets

(56) References Cited

U.S. PATENT DOCUMENTS

| | | |
|---|---|---|
| 2001/0036308 A1 | 11/2001 | Katayama et al. |
| 2003/0088421 A1* | 5/2003 | Maes ................... G10L 15/30 704/270.1 |
| 2004/0154460 A1* | 8/2004 | Virolainen ........... G10H 1/0058 84/645 |
| 2007/0110074 A1* | 5/2007 | Bradley ............ H04N 21/4305 370/395.51 |
| 2008/0024599 A1 | 1/2008 | Hirakawa |
| 2008/0052414 A1 | 2/2008 | Panigrahi et al. |
| 2008/0137755 A1 | 6/2008 | Onur et al. |
| 2008/0198930 A1 | 8/2008 | Matsubayashi |
| 2008/0198931 A1 | 8/2008 | Chappalli et al. |
| 2008/0278445 A1 | 11/2008 | Sweetser et al. |
| 2009/0100493 A1 | 4/2009 | Jones et al. |
| 2009/0210817 A1 | 8/2009 | Schmieder et al. |
| 2009/0241110 A1 | 9/2009 | Heo et al. |
| 2009/0284442 A1 | 11/2009 | Pagan |
| 2009/0285217 A1 | 11/2009 | Frink et al. |
| 2010/0045690 A1 | 2/2010 | Handschy et al. |
| 2010/0046623 A1 | 2/2010 | Chen et al. |
| 2010/0091042 A1 | 4/2010 | Inoue |
| 2010/0128054 A1 | 5/2010 | Manabe |
| 2010/0164839 A1 | 7/2010 | Lyons et al. |
| 2010/0231738 A1 | 9/2010 | Border et al. |
| 2010/0231800 A1 | 9/2010 | White et al. |
| 2010/0256344 A1 | 10/2010 | Thompson et al. |
| 2011/0043806 A1 | 2/2011 | Guetta et al. |
| 2011/0141372 A1 | 6/2011 | Kato et al. |
| 2011/0209064 A1 | 8/2011 | Jorgensen et al. |
| 2011/0228984 A1 | 9/2011 | Papke et al. |
| 2011/0231419 A1 | 9/2011 | Papke et al. |
| 2012/0226742 A1 | 9/2012 | Momchilov et al. |
| 2012/0314599 A1 | 12/2012 | Vilke et al. |
| 2012/0324365 A1 | 12/2012 | Momchilov et al. |
| 2013/0033618 A1 | 2/2013 | Kato et al. |
| 2013/0044885 A1* | 2/2013 | Master ................. A47C 21/003 381/56 |
| 2013/0055102 A1 | 2/2013 | Matthews et al. |
| 2013/0064289 A1 | 3/2013 | Chernyshev et al. |
| 2013/0185633 A1 | 7/2013 | Bunker et al. |
| 2013/0215290 A1 | 8/2013 | Solhusvik et al. |
| 2013/0219012 A1 | 8/2013 | Suresh et al. |
| 2014/0043349 A1 | 2/2014 | Parmar et al. |
| 2014/0188977 A1 | 7/2014 | Song et al. |
| 2014/0244863 A1* | 8/2014 | Bradley ............ H04L 29/06027 709/248 |
| 2014/0282753 A1 | 9/2014 | Li et al. |
| 2014/0359494 A1 | 12/2014 | Clark |
| 2015/0117545 A1 | 4/2015 | Fu et al. |
| 2015/0125032 A1 | 5/2015 | Yamanaka et al. |
| 2015/0244812 A1 | 8/2015 | Brunson et al. |
| 2015/0244940 A1 | 8/2015 | Lombardi et al. |
| 2015/0254726 A1 | 9/2015 | Cassidy et al. |
| 2015/0350555 A1 | 12/2015 | Nishi |
| 2016/0127432 A1 | 5/2016 | Privat |
| 2016/0133224 A1 | 5/2016 | Nakajima |
| 2016/0189393 A1 | 6/2016 | Rao et al. |
| 2016/0218986 A1 | 7/2016 | Klemetti et al. |
| 2016/0219218 A1 | 7/2016 | Kinoshita |
| 2016/0246560 A1 | 8/2016 | Petrov |
| 2017/0034542 A1 | 2/2017 | Yabu |
| 2017/0054793 A1 | 2/2017 | Urbach |
| 2017/0104909 A1 | 4/2017 | Nakajima |
| 2017/0141906 A1 | 5/2017 | Rainish |
| 2017/0150045 A1 | 5/2017 | Goswami et al. |
| 2017/0256281 A1* | 9/2017 | Hoarty .................. G11B 20/02 |
| 2017/0279757 A1 | 9/2017 | Kereth et al. |
| 2017/0365237 A1 | 12/2017 | Koneru et al. |
| 2018/0027167 A1 | 1/2018 | He et al. |
| 2018/0054481 A1* | 2/2018 | Bradley ............ H04L 29/06027 |
| 2018/0158424 A1 | 6/2018 | Okamoto et al. |
| 2018/0242920 A1 | 8/2018 | Hresko et al. |
| 2018/0332132 A1 | 11/2018 | Sampath et al. |
| 2019/0012531 A1 | 1/2019 | Radwin et al. |
| 2019/0141351 A1 | 5/2019 | Alakuijala et al. |
| 2019/0156785 A1 | 5/2019 | Marchya et al. |
| 2019/0281206 A1 | 9/2019 | Lee et al. |
| 2019/0302881 A1 | 10/2019 | Chan et al. |
| 2020/0059643 A1 | 2/2020 | Marchya et al. |
| 2020/0257807 A1 | 8/2020 | Chen |

OTHER PUBLICATIONS

International Search Report and Written Opinion, dated Feb. 26, 2020, in International Patent Application No. PCT/US2019/066072, filed Dec. 12, 2019.
Wikipedia, "IEEE 802.11," page last modified Feb. 7, 2017, retrieved Feb. 13, 2017, from https://en.wikipedia.org/wiki/IEEE_802.11, 9 pages.
Wikipedia, "IEEE 802.16," page last modified Nov. 21, 2016, retrieved Feb. 13, 2017, from https://en.wikipedia.org/wiki/IEEE_802.16, 8 pages.
Wikipedia, "IEEE 802.21," page last modified Aug. 4, 2016, retrieved Feb. 13, 2017, from https://en.wikipedia.org/wiki/IEEE_802.21, 3 pages.
U.S. Appl. No. 16/219,865, filed Dec. 13, 2018.
U.S. Appl. No. 16/369,628, filed Mar. 29, 2019.
U.S. Appl. No. 16/217,653, filed Dec. 12, 2018.
U.S. Appl. No. 16/295,965, filed Mar. 7, 2019.
U.S. Appl. No. 16/369,692, filed Mar. 29, 2019.
U.S. Appl. No. 16/369,597, filed Mar. 29, 2019.
U.S. Appl. No. 16/369,642, filed Mar. 29, 2019.
IEEE 100, "The Authoritative Dictionary of IEEE Standard Terms,"Seventh Edition, IEEE Standards Information Network, IEEE Press, Dec. 2000, 3 pages (pertinent p. 452).

* cited by examiner

TECHNIQUES FOR LOSS MITIGATION OF AUDIO STREAMS

BACKGROUND

In various contexts, managing the integrity of transmitted audio streams is important. Organizations, for example, often comprise networks of computing devices that must communicate to other devices and clients. Organizations may communicate through voice, video, or both. The communications often use networks that connect with other networks, and often span multiple geographic regions. As the size and complexities of such networks grow, managing the integrity of transmitted audio between devices can be increasingly difficult.

Poorly managed audio streams can result in accidental understandings, miscommunication, and misperceptions of the intended purpose of the audio. This may result in significant delays and unnecessary costs that can significantly hinder the operations of an organization. Managing the integrity of audio streams and communications along various networks and entities is generally complicated, complex, and requires significant amounts of resources to ensure proper transmission.

BRIEF DESCRIPTION OF THE DRAWINGS

Various techniques will be described with reference to the drawings, in which.

DETAILED DESCRIPTION

Figure 1:
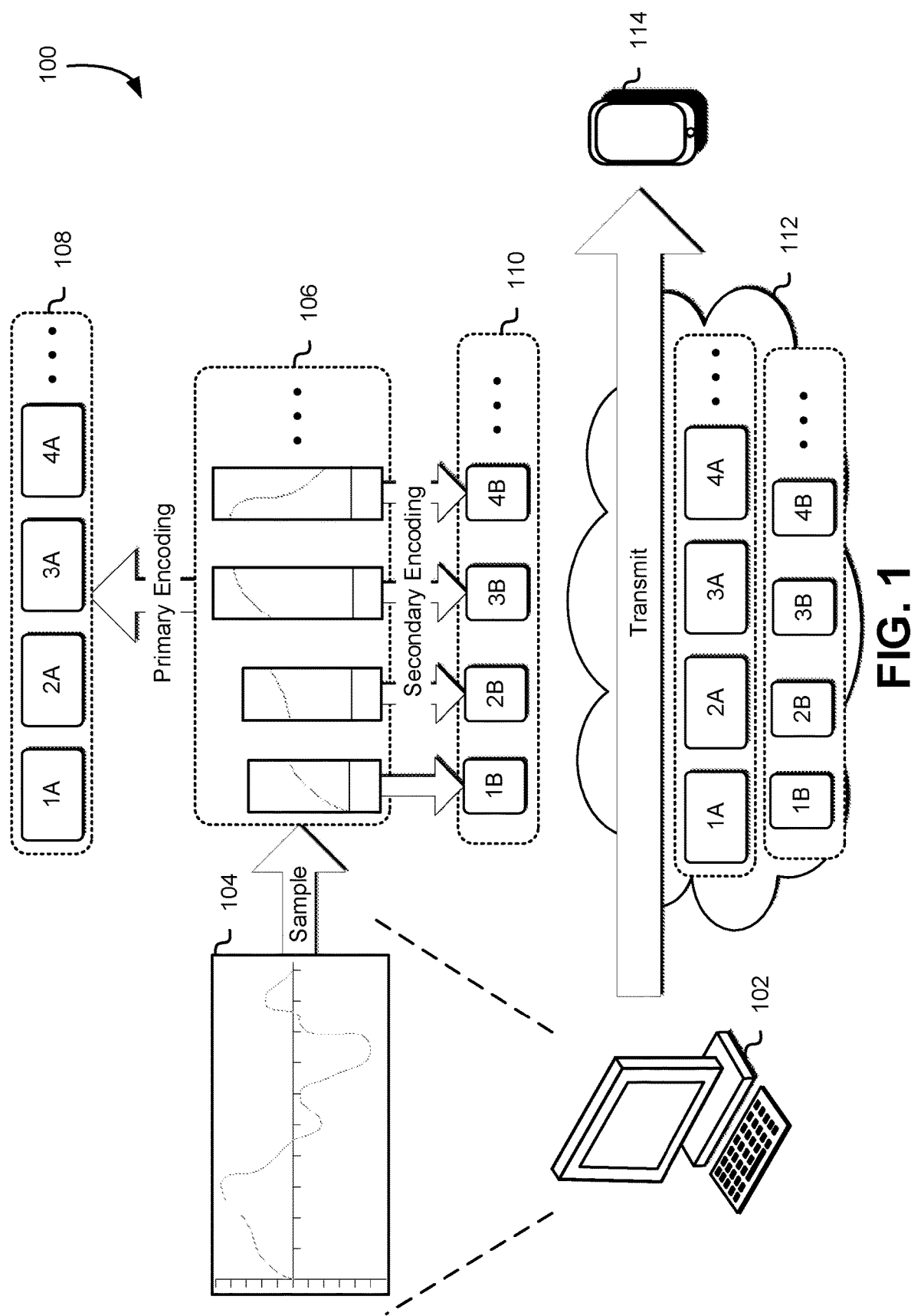
FIG. 1 shows an illustrative example of a computing environment in which a system generates and transmits audio streams with loss protection, in accordance with at least one embodiment.

Techniques described and suggested herein relate to protecting the integrity of audio streams in a manner that preserves fidelity when data is lost due to various factors in transmitting the audio stream. Processes for transmitting an audio stream generally involve the usage of various networks and various transmission methods. These networks, which may be wireless, may traverse large distances and mediums that contain various interference causing materials. The interference causing materials may adversely affect the networks; networks may be susceptible to interference and loss of data due to the interference. Additionally, the networks themselves may be unreliable and cause certain portions of data within the networks to be dropped, or lost. Loss may arise under various circumstances such as those described above and below, and may include loss that is inadvertently caused (e.g., due to stochastic loss) or even intentionally caused (e.g., a malicious actor attempting to interfere with the communications of a computer system or network).

To mitigate the effect of losses in various types of networks, a system may send secondary streams in the transmission of a stream. A stream (e.g., audio stream) may refer to a sequence of data elements (e.g., messages, data packets, datagrams) transmitted over a network that can be reconstructed by a recipient computer system to produce an output stream. In some embodiments, the output stream is a true representation (e.g., bit-by-bit reproduction) of a source, whereas in some embodiments the output stream that the recipient generates is an approximation of an original data source (e.g., in cases where lossy compression—as opposed to lossless compression—is applied). Streams described in this disclosure may include audio streams, video streams, multimedia streams including audio and video components, and more. The secondary streams may be encodings of a primary stream, and may also be encoded utilizing various compressive encoding methods. A secondary stream may be encoded such that they have lower fidelity than the primary stream, and greater space efficiency. Alternatively, the secondary stream may greater space efficiency and corresponding fidelity, based on using different encoding processes for the two streams. The secondary streams can be utilized in place of lost data from the primary stream. The primary stream may lose significant portions of data due to its transmission; the secondary streams transmitted along with the primary stream may be utilized to replace the lost portions. The secondary streams also may utilize significantly less bandwidth or space than the primary stream, resulting in a minimal overhead for protecting against losses in the primary stream. Techniques described in connection with the primary and secondary streams can be utilized to help repair and/or protect the secondary stream by utilizing a tertiary stream.

A system may have access to an audio source, which may be an analog or digital audio source, such as audio recorded from a microphone or headset. There are various circumstances in which the system transmits the audio source to another system. In some cases, the system may compress the audio source, for example, to save bandwidth. The transmission may utilize a network such as a wireless cellular network that is susceptible to interference and loss of portions of the transmission or even the entire transmission. To maintain the integrity of the transmission, a system may process the audio source by producing multiple encodings and versions of the audio source. A primary, high-fidelity audio stream as well as non-primary, low-fidelity audio streams may be produced from the audio source.

The system may transmit multiple versions of the audio source across a wireless network. The system receiving the transmission may determine that one or more portions of the primary audio stream have been lost due to various factors in its transmission. The system may then utilize the multiple versions of the audio stream, which were transmitted along with the primary audio stream, to replace the lost portions of the primary audio stream. The replacement may entail utilizing a portion from a low-fidelity version of the primary audio stream in place of the missing portion of the primary audio stream. Additionally, portions of the low-fidelity versions of the primary audio stream may be lost; the system may utilize additional low-fidelity versions of the primary audio stream to serve as potential replacements for each other and for the primary audio stream.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a computing environment 100 in which various embodiments can be implemented. In the computing environment 100, the system 102 may be one or more computer systems configured with computer-executable instructions. The computer-executable instructions may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some examples, the system 102 may be one or more instances of a physical computing instance, such as a physical server computer, or one or more instances of a virtual computing instance, such as a virtual machine, which may be hosted on one or more computer servers. The system 102 may also be a computing device, such as a mobile device, a personal computing device, an Internet-of-Things (IoT) computing device, and/or variations thereof. Other variations are also considered as being within the scope of the present disclosure.

In an embodiment, the system 102 obtains an audio source 104. The audio source 104 may be an analog or digital audio source, such as audio recorded from a microphone or headset connected to the system 102. In some embodiments, the recording device may be physically attached to the system, such as in the case of a smartphone. The microphone may be a digital microphone, however, other types of microphones can also be utilized if the output signal thereof is appropriately converted to a digital format. The term microphone may be used in its generic sense to mean all sound capturing devices. The system may obtain the audio source 104 by recording, processing, or detecting analog waveforms captured from a microphone or headset and converting the analog wave forms to a digital audio source using a digital-to-audio converter. In some embodiments, the audio source 104 may be audio captured using as part of an ongoing conversation of a telephone call, video call, voice over IP (VoIP) call, etc. The audio source 104 may also be a multimedia source, and may comprise various combinations of audio and video that are captured in which the audio (or a portion thereof) is isolated. Generally, it should be understood that unless explicitly contradicted or otherwise clear from context, an audio source, within one or more systems, can refer to any suitable media having an audio component, such as media that is exclusively audio, audio and video, or otherwise.

Additionally, the audio source 104 may be a real-time stream, such as a television broadcast, radio broadcast, telephone call, and/or variations thereof. In various embodiments, a real-time stream refers to a stream in which the data and/or media being streamed is occurring live, or in "real time", with minimal to no latency. Real-time streams may include certain latency requirements, such as the various requirements set forth by the International Telecommunications Union (ITU) (e.g., ITU Recommendation G.114 recommends a latency of under 150 ms for voice audio). In some examples, a real-time stream may be a live television broadcast; a live television broadcast may entail specific latency and/or broadcast delay requirements (e.g., the live television broadcast of the "Super Bowl" has a broadcast delay of a few seconds). The audio source 104 may originate from a system, such as the system 102, or alternatively from another system or systems; such systems may include local computing devices, such as a mobile device and/or a personal computing device, or remote computing devices, such as a network of connected servers and/or devices.

The system 102 may determine a sampling rate for encoding the audio source 104. In some examples, the sampling rate may determine the rate at which samples or values of the audio source 104 are captured; the samples captured may be used to construct a discrete representation of the audio source. In various embodiments, the sampling rate may range from 8,000 Hertz (samples per second) for audio such as telephone calls, 44,100 Hertz for audio such as recorded or live music, and 192,000 Hertz for high-fidelity audio. The sampling rate may also be determined based on other criteria, such as desired quality, desired size, and/or variations thereof.

Following the determination of the sampling rate, the system 102 may sample the audio source 104 according to the sampling rate to identify a plurality of samples 106 of the audio source 104. In some examples, the plurality of samples 106 may form a high-fidelity discrete representation of the audio source 104. Additionally or alternatively, the plurality of samples 106 may form a reduced, low-fidelity discrete representation of the audio source 104. The fidelity of the representation may be dependent on the sampling rate chosen for the audio source 104. In an embodiment, a higher sampling rate results in more samples taken over a time interval, resulting in a higher-fidelity representation of the audio source. The number of samples within the plurality of samples 106 may correspond directly to the number of samples captured at the sampling rate determined earlier. The plurality of samples 106 may then be encoded as a first audio output stream 108.

The first audio output stream 108 may be an encoding of the plurality of samples 106. The first audio output stream 108 may be produced by encoding each sample of the plurality of samples 106; the first audio output stream 108 may comprise an encoded plurality of samples. In some examples, each numbered block may denote a single sample (e.g., '1A' denotes a first sample, '2A' denotes a second sample . . . etc.). The letters may denote the specific encoding of the stream (e.g., 'A' denotes the encoding of the first audio output stream). The encoding may be a high-fidelity encoding of the plurality of samples 106, and may utilize audio codecs such as PCM (Pulse Code Modulation), FLAC (Free Lossless Audio Codec), MPEG-4 ALS (MPEG-4 Audio Lossless Coding), and/or variations thereof. In some examples, the first audio output stream 108 may be denoted as the primary stream. In an embodiment, the first audio output stream 108 has the same sample rate as used to generate the plurality of samples 106.

Additionally, samples of the plurality of samples 106 may be encoded to collectively generate a second audio output stream 110. The second audio output stream 110 may be encoded with greater space-efficiency than the first audio output stream 108. The second audio output stream 110 may, for example comprise compressed samples of the plurality of samples 106. In some examples, each numbered block may denote a single sample (e.g., '1B' denotes a first sample, '2B' denotes a second sample . . . etc.). The letters may denote the specific encoding of the stream (e.g., B denotes the encoding of the second audio output stream). The compression may be achieved using a lossy compression algorithm such as ATRAC (Adaptive Transform Acoustic Coding), DTS (Dedicated To Sound) Coherent Acoustics, MPEG-4 Audio, and/or variations thereof. Generally, it should be understood that unless explicitly contradicted or otherwise clear from context, the encoding and/or compression of data, within one or more systems, can performed in any suitable matter, such as lossless (e.g., by preserving the entirety of the data), lossy (e.g., by preserving an inexact approximation of the data), or otherwise. The compression ratio of the second audio output stream 110 may be dependent on several factors, such as rates of stochastic loss of data from the network 112. It should be noted that the plurality of samples 106 used to generate the second audio output stream 110 may be the same samples 106 that were determined as part of generating the first audio output stream 108—said another way, in some embodiments, it is not required to perform a re-sampling as part of generating the second audio output stream 110 and the system instead apply compression techniques based on the plurality of samples 106 determined/selected as part of generating the first audio output stream 108.

In an embodiment, the second audio output stream 110 has the same sample rate as used to generate the plurality of samples 106. Additionally, in various embodiments, the second audio output stream 110 is no more than 10% the size of the first audio output stream 108. The size of the stream may be a measure of the bandwidth utilized by the streams in their transmission; in this case the second audio output stream 110 may utilize no more than 10% of the bandwidth utilized by the first audio output stream 108. Additionally or alternatively, size may refer to a measure of bits that a stream may occupy. Generally, it should be understood that unless explicitly contradicted or otherwise clear from context, the size of data, within one or more systems, may refer to any suitable number of qualitative/quantitative factors, such as the measure of bits that the data occupies, the bandwidth utilized by the data in streaming/transmission, or otherwise.

In an embodiment, the first audio output stream 108 has high fidelity than the second audio output stream 110. For example, the first audio output stream 108 may be encoded using a lossless encoding, while the second audio output stream 110 may be encoded using a lossy format. In some cases and embodiments, both the first audio output stream 108 and the second audio output stream 110 are encoded using the same or similar encoding scheme (such as a lossy encoding scheme), but the second audio output stream 110 is encoded with greater space efficiency relative to the first audio output stream 108. Here, space efficiency refers to the amount of data necessary to represent equivalent portions of an audio stream. For example, a portion of an audio stream might be encoded using 25 kilobytes in one coding, but with only 2 kilobytes in a more space efficient encoding.

Note that in some cases the first audio output stream 108 may be described as having higher fidelity than the second audio output stream 110. Here, fidelity refers to the amount of loss in the audio stream. Accordingly, audio encoded using a lossless format may be described as having higher fidelity than audio encoded using a lossy format. Alternatively, audio encoded using a lossy format may be described as having highly fidelity than audio encoded using a format with a greater amount of loss.

In an embodiment, the first audio output stream 108 and the second audio output stream 110 are transmitted to a system 114 over a network 112. The network 112 may be a wireless network used for transmitting data, and may be any appropriate network to transmit data, including an intranet, the Internet, a cellular network, a local area network, a satellite network, or any such network and/or combination. The network 112 may utilize UDP (User Datagram Protocol) to transmit data in the form of packets. In various embodiments, UDP is a transport layer protocol for communication that utilizes IP (Internet Protocol) packets to transmit data; the data may be contained in the form of datagrams. The first audio output stream 108 and the second audio output stream 110 may be encoded in a plurality of datagrams and may be transmitted over a network 112; in some examples, a single datagram corresponds to encodings of a single sample of the audio source. Further information regarding the transmission of the audio streams can be found in the description of FIG. 5.

The network 112 may be subject to non-zero stochastic loss of the UDP datagrams. Sources of stochastic loss may include random loss such as spectral interference, multipath interference/loss, ionospheric interference/loss, and/or variations thereof. When a transmission medium is subject to stochastic loss, there may be a non-zero probability p (i.e., $1 \geq p > 0$) that the units of data sent over the transmission medium are not received by the recipient. The probability that a first unit of data is lost (e.g., not successfully received by the recipient) may be modeled or estimated to be equal to the probability that a second unit of data is lost.

In some embodiments, subjecting a network or transmission medium to a stochastic loss of p may refer to a model in which units of data transmitted over the medium to a recipient are not received by the recipient at a rate of p (i.e., recipient receives data transmissions at a rate of 1−p). In an embodiment, the network 112 is subject to a stochastic loss of at least 10% and not exceeding 20%. Further information regarding stochastic loss in regards to the network 112 can be found in the description of FIG. 2. Additionally, the rate of stochastic loss may determine the data compression ratio of the second audio output stream 110. In various embodiments, the data compression ratio of the second audio output stream 110 is inversely proportional to the estimated rate of stochastic loss. In an embodiment, inversely proportional refers to a mathematical relationship between the data compression ratio of the second audio output stream 110 and the rate of stochastic loss; in some examples, this may entail as the rates of stochastic loss increase, the ratios of compression decrease. More generally, in some embodiments the rate of stochastic loss may be used to determine the relative space-efficiency and fidelity of the primary and secondary output streams. For example, the system 114 may determine an acceptable level of fidelity for the secondary output stream. The system 114 can determine that the acceptable level of fidelity should be increased when the rate of stochastic loss is relatively high, and decreased when the rate of stochastic loss is relatively low. Space efficiency, and other aspects of encoding, can be adjusted in view of the permissible levels of fidelity.

In some examples, the system 114 may be a system like the system 102. The system 114 may be one or more computer systems configured with computer-executable instructions. The computer-executable instructions may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some examples, the system 114 may be one or more instances of a physical computing instance, such as a physical server computer, or one or more instances of a virtual computing instance, such as a virtual machine, which may be hosted on one or more computer servers. The system 114 may also be a computing device, such as a mobile device, a personal computing device, an Internet-of-Things (IoT) device, and/or variations thereof. Other variations are also considered as being within the scope of the present disclosure. The system 114 may receive the transmission, which may be denoted as audio streams with loss protection comprising the first audio output stream 108 and second audio output stream 110, through network 112 for further processing. In an embodiment, portions of the audio output streams transmitted by the first system 102 to the recipient system 114 over the network 112 are not received by the system 114, perhaps due to stochastic or deterministic loss over the network 112. The system 114 may receive the remaining portions of the audio output stream and utilize techniques described in connection with FIG. 2 to repair and/or protect the integrity of the audio streams.

Figure 2:
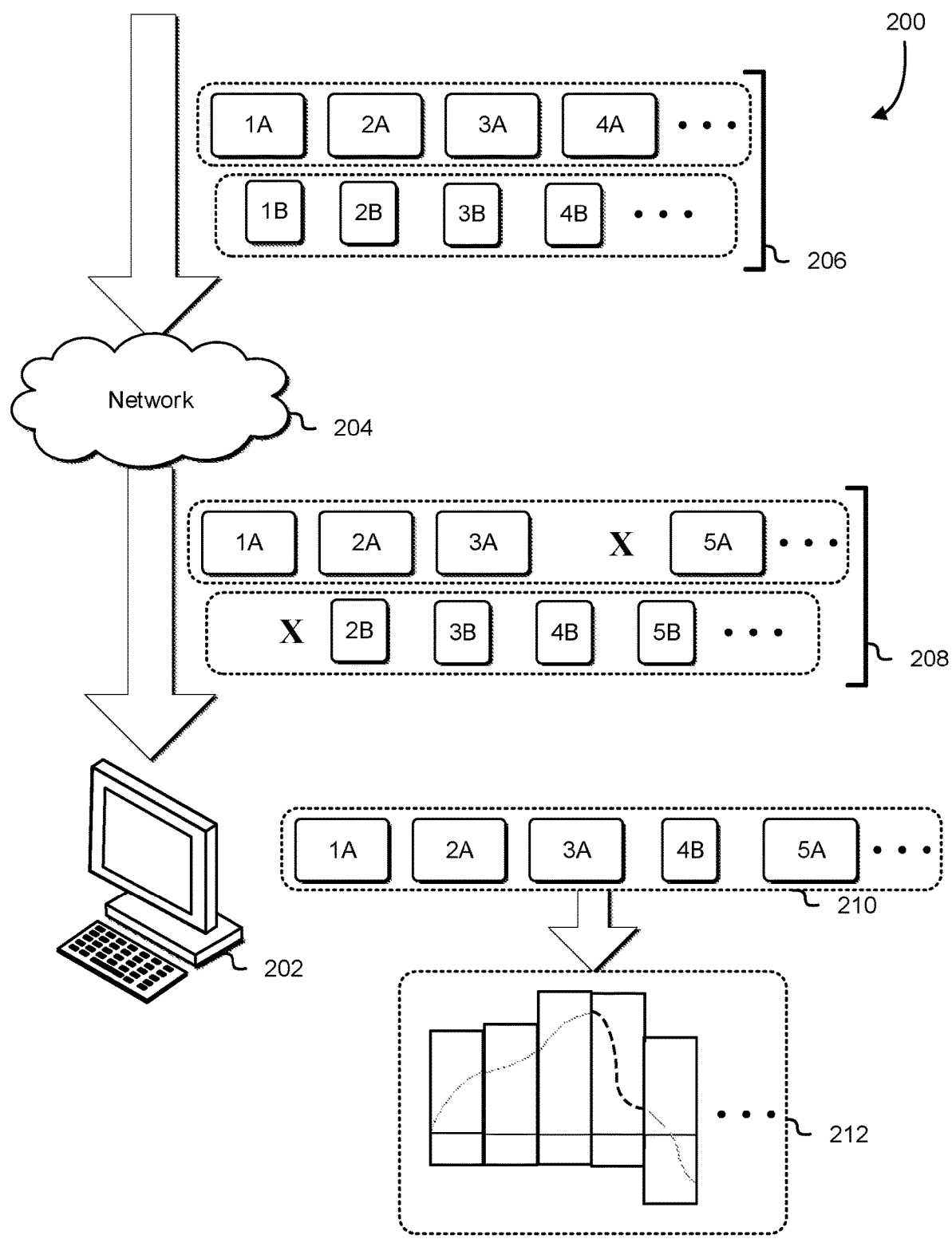
FIG. 2 shows an illustrative example of a computing environment in which a system receives and processes audio streams with loss protection, in accordance with at least one embodiment.

FIG. 2 illustrates an environment 200 in which various embodiments can be implemented. Specifically, FIG. 2 depicts a system 202 receiving and processing audio streams with loss protection; the streams 206 may be denoted as audio streams with loss protection. In some embodiments, the streams 206 comprises a first audio output stream and a second audio output stream in accordance with those described in connection with FIG. 1. The streams 206 may originate from various encodings/compressions of samples from a plurality of samples taken from an audio source. Examples of audio sources can be found in the description of FIG. 1. The encodings/compressions may include codecs such as PCM (Pulse Code Modulation), FLAC (Free Lossless Audio Codec), MPEG-4 ALS (MPEG-4 Audio Lossless Coding), ATRAC (Adaptive Transform Acoustic Coding), DTS (Dedicated To Sound) Coherent Acoustics, MPEG-4 Audio, and/or variations thereof; the various encodings may be utilized to generate a high-fidelity version of the plurality of samples (denoted in FIG. 2 by 1A, 2A, 3A . . . ), and a low-fidelity/compressed version of the plurality of samples (denoted in FIG. 2 by 1B, 2B, 3B . . . ), which may be no more than 10% of the size of the high-fidelity version. In some examples, the high-fidelity version of the plurality of samples may be denoted as the primary stream, or the first audio output stream. Additionally, in various embodiments, the streams 206 may comprise multiple high-fidelity and low-fidelity/compressed streams.

The streams 206 may be transmitted to a computing entity, like the system 202, over a network 204. The network 204 may be a wireless network used for transmitting data, and may be any appropriate network to transmit data, including an intranet, the Internet, a cellular network, a local area network, a satellite network, or any such network and/or combination. The network 204 may utilize the UDP (User Datagram Protocol) to transmit data in the form of packets. In various embodiments, the UDP is a transport layer protocol for communication that utilizes IP (Internet Protocol) packets to transmit data; the data may be contained in the form of datagrams. The streams 206 may be encoded in a plurality of datagrams and may be transmitted over a network 204. Further information regarding the transmission of data through the network 204 can be found in the description of FIG. 5.

The network 204 may be subject to a non-zero stochastic loss of the UDP datagrams. Sources of stochastic loss may include random loss such as spectral interference, multipath interference/loss, ionospheric interference/loss, and/or variations thereof. In an embodiment, spectral interference refers interference caused by particulate matter; the particulate matter can be present in the transmission medium, such as the Earth's atmosphere. In some examples, the particulate matter may cause interference with a specific wavelength; the wavelength may be distorted by the interference. Multipath interference/loss, in an embodiment, refers to interference caused by elements, present in a transmission medium such as the Earth's atmosphere, that reflect signals. The reflection of a signal may cause a distortion of the signal when it is received. For example, a signal may be sent to a receiver. The transmission medium of the signal may contain elements that may cause the signal to be reflected, or travel along a longer path. Due to this phenomenon, the receiver may receive the signal, as well as copies of the signal at various intervals due to the elements in the transmission medium; these may result in a distortion/loss of portions of the signal. In an embodiment, ionospheric interference/loss refers to interference caused by the ionosphere of Earth's atmosphere. The ionosphere, which is the ionized part of Earth's upper atmosphere, may slow down and scatter various signals, resulting in their loss/distortion.

When a transmission medium is subject to stochastic loss, there may be a non-zero probability p (i.e., $1 \geq p > 0$) that the units of data sent over the transmission medium are not received by the recipient. The probability that a first unit of data is lost (e.g., not successfully received by the recipient) may be modeled or estimated to be equal to the probability that a second unit of data is lost. In some embodiments, subjecting a network or transmission medium to a stochastic loss of p may refer to a model in which units of data transmitted over the medium to a recipient are not received by the recipient at a rate of p. In an embodiment, the network 204 is subject to a stochastic loss of at least 10% and not exceeding 20%. In an embodiment, the network 204 is subject to a stochastic loss not exceeding 20%. Additionally, in various embodiments, the data compression ratio of the low-fidelity/compressed stream that streams 206 comprises is inversely proportional to the rates of stochastic loss.

In various embodiments, the system 202 is the same or different system as the recipient computer system (e.g., IoT device or smartphone) discussed in connection with FIG. 1. The system 202 may be one or more computer systems configured with computer-executable instructions. The computer-executable instructions may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some examples, the system 202 may be one or more instances of a physical computing instance, such as a physical server computer, or one or more instances of a virtual computing instance, such as a virtual machine, which may be hosted on one or more computer servers. The system 202 may also be a computing device, such as a mobile device, a personal computing device, an internet enabled computing device, and/or variations thereof. Other variations are also considered as being within the scope of the present disclosure.

The system 202 may receive the streams 208, which may be the streams 206 after it has undergone stochastic loss as a result of its transmission utilizing the wireless network 204. In some examples, each numbered block may denote a single encoded sample (e.g., 1A denotes a first sample, 2A denotes a second sample . . . etc.) of a plurality of encoded samples that the specific stream comprises. The letters may denote the specific encoding of the plurality of samples that the stream comprises (e.g., A denotes the high-fidelity encoding, B denotes the low-fidelity/compression encoding). In an embodiment, the "X" denotes a missing sample of the streams 208. For example, in FIG. 2, the streams 208 has an "X" in place of 4A. This may indicate that the "4A" (fourth, high-fidelity encoding) sample has been lost due to stochastic loss. Additionally, the streams 208 has an "X" in place of 1B. This may indicate that the "1B" (first, low-fidelity encoding) sample has been lost due to stochastic loss.

The streams 208 may be utilized by the system 202 to reconstruct the high-fidelity encoding of the original plurality of samples, which may be denoted as the primary stream and/or the first audio output stream. In an embodiment, the system 202 detects loss of portions/samples of the primary, otherwise known as first audio output, stream (denoted by 1A, 2A . . . etc.) to determine how to utilize the multiple streams within streams 208 to replace the lost portions. The system 202 may detect loss by various methods. The system may detect that a specific sample of the primary stream was expected but was not received. This may be accomplished by detecting that a certain sample of the primary stream hasn't been received within a specific threshold duration (e.g., within 100 ms of the certain sample having to be utilized). This may also be accomplished based by the ordering of the samples. For example, samples "3A" and "5A" may have been received; the system 202 may detect that sample "4A" is missing. Other variations are also considered as being within the scope of the present disclosure.

Following the detection of the lost samples, the system 202 may restore the lost samples by utilizing one or more samples of the other streams the streams 208 comprises in place of the missing sample. In an embodiment, the samples from the other streams the system 202 utilizes in place of the missing samples of the primary stream are no more than 10% of the size of the missing samples of the primary stream. In some examples, size may refer to the bandwidth utilized by a sample, which may be a part of a plurality of samples a stream comprises, in its transmission. Furthermore, in various embodiments, because all of the streams within streams 208 originate from a single plurality of samples (see FIG. 1), the timing, length, and/or other characteristics of the samples of the streams are identical; no techniques such as interpolation, time shifting, transformations, and/or variations thereof are required to replace a missing sample of the primary stream with a different sample of a non-primary stream.

The system 202 may replace the missing portions of the primary stream with portions of the secondary stream to create a complete stream 210; replacement may entail playing back and/or storing portions of the secondary stream in place of the missing portions of the primary stream. The complete stream 210 may comprise high-fidelity encoded samples along with low-fidelity encoded samples in place of the missing high-fidelity encoded samples. Waveform 212 depicts the complete stream 210; the solid red line indicates the original high-fidelity samples, whilst the dotted line indicates the low-fidelity replacement sample of the original high-fidelity sample. Further information regarding the restored stream from audio streams with loss protection can be found in the descriptions of FIGS. 3 and 4.

Figure 3:
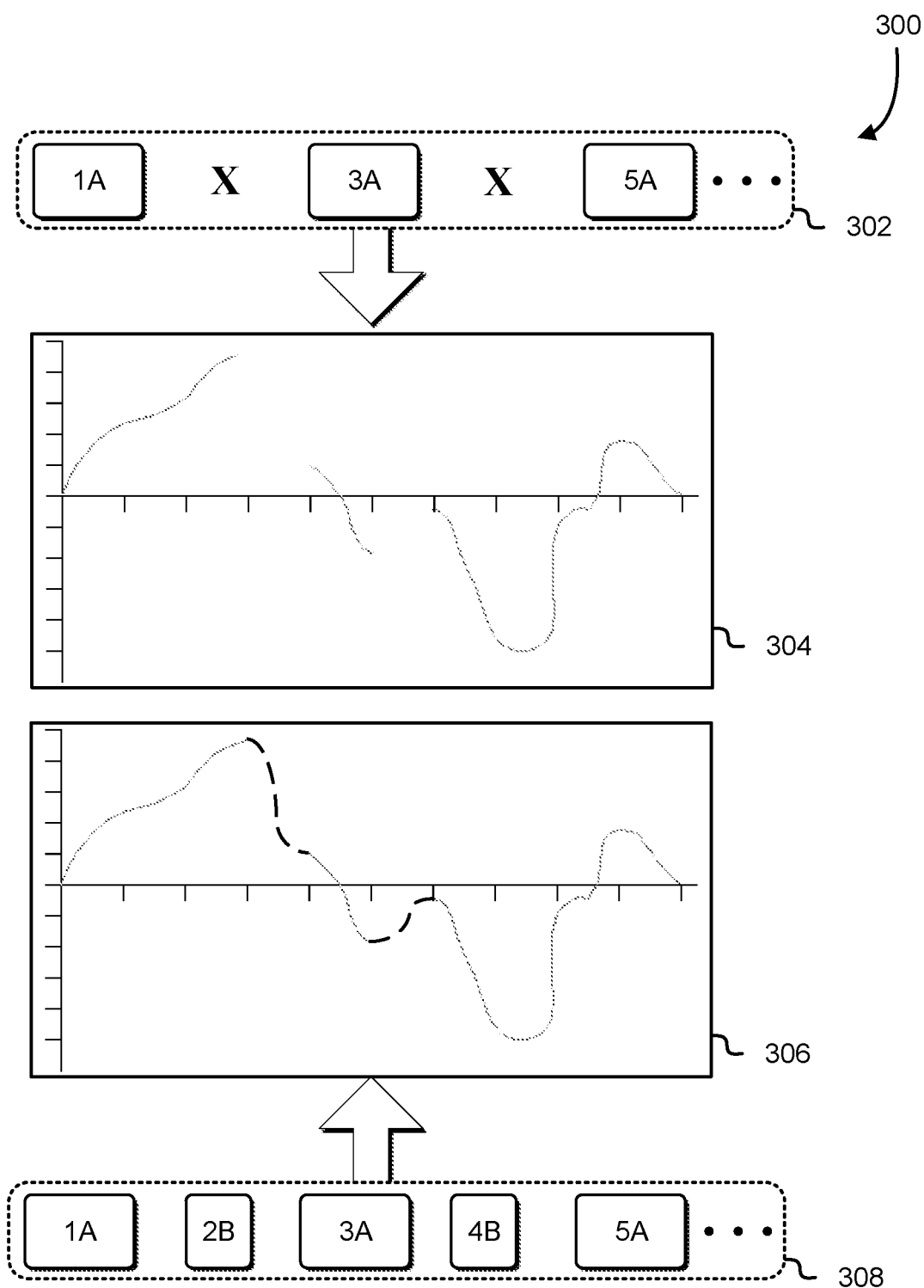
FIG. 3 shows an illustrative example of audio streams with loss protection, in accordance with at least one embodiment.

FIG. 3 illustrates an example diagram 300 of a restored stream from audio streams with loss protection. Techniques described in connection with FIG. 3—such as techniques for loss protection in audio streams—may be implemented by any suitable system, such as those described in connection with FIGS. 1 and 2. Specifically, FIG. 3 depicts a restored audio stream 308, and an original audio stream 302 that the audio stream 308 has been restored from. In an embodiment, the audio stream 308 is a result of an audio stream undergoing some or all of the processes depicted in FIG. 2. The audio stream 308 may originate from an audio stream 302. In various embodiments, the audio stream 302 is a high-fidelity encoding of a plurality of samples originating from an audio source. The audio stream 302 may be known as the primary and/or first audio output stream and be transmitted in a stream along with other, low-fidelity streams, which may originate from encodings of the same plurality of samples the audio stream 302 originates from. Correspondingly, waveform 304 may depict a visualization of the audio stream 302. In an embodiment, the waveform 304 is a visual depiction of the audio stream 302; the y-axis may refer to the amplitude of the audio stream, and the x-axis may refer to various time intervals of the audio stream.

The audio stream 302 may be missing several portions as a result of transmitting the audio stream 302 from one location to another. The transmission may utilize a wireless network; a wireless network may be subject to various interferences and losses of the transmission. The losses may be due to external factors, and may be a stochastic loss. Loss of a portion of the audio stream is represented, in FIG. 3, with a "X" symbol. Further information regarding stochastic loss in regards to the transmission network can be found in the description of FIG. 2. In various embodiments, the portions of the audio stream 302 are an ordered set, ascending numerically; the audio stream 302 may be missing portions "2A" and "4A".

The audio stream 302, which may be missing portions due to stochastic loss, may be restored to audio stream 308. In an embodiment, audio stream 308 is the result of restoring the missing portions of audio stream 302 by replacing the missing portions with portions of alternative, non-primary streams that the transmission containing the audio stream 302 comprises. The audio stream 308 may utilize portions of other streams as replacements for the missing portions. For example, the missing portion "2A" may be replaced by an alternative portion "2B", and the missing portion "4A" may be replaced by an alternative portion "4B". In various embodiments, the alternative stream that the alternative portions "2B" and "4B" originate from is no more than 10% of the size of the high-fidelity stream that the audio stream 302 originates from. In some examples, size refers to the bandwidth utilized by a stream in its transmission. The waveform 306 depicts a visualization of the audio stream 308; the dotted lines represent the replaced portions.

In various embodiments, the multiple streams that the transmission containing the audio stream 302 comprises originate from encodings of a single plurality of samples; this results in each stream, of the multiple streams, comprising samples that share the same timing, length, and/or other characteristics with other samples that the other multiple streams, within the transmission, comprise. Therefore portions from various streams can replace one another one-to-one without utilizing various techniques such as interpolation, time shifting, transformations, and/or variations to assist in allowing the replacement portion to fit.

Figure 4:
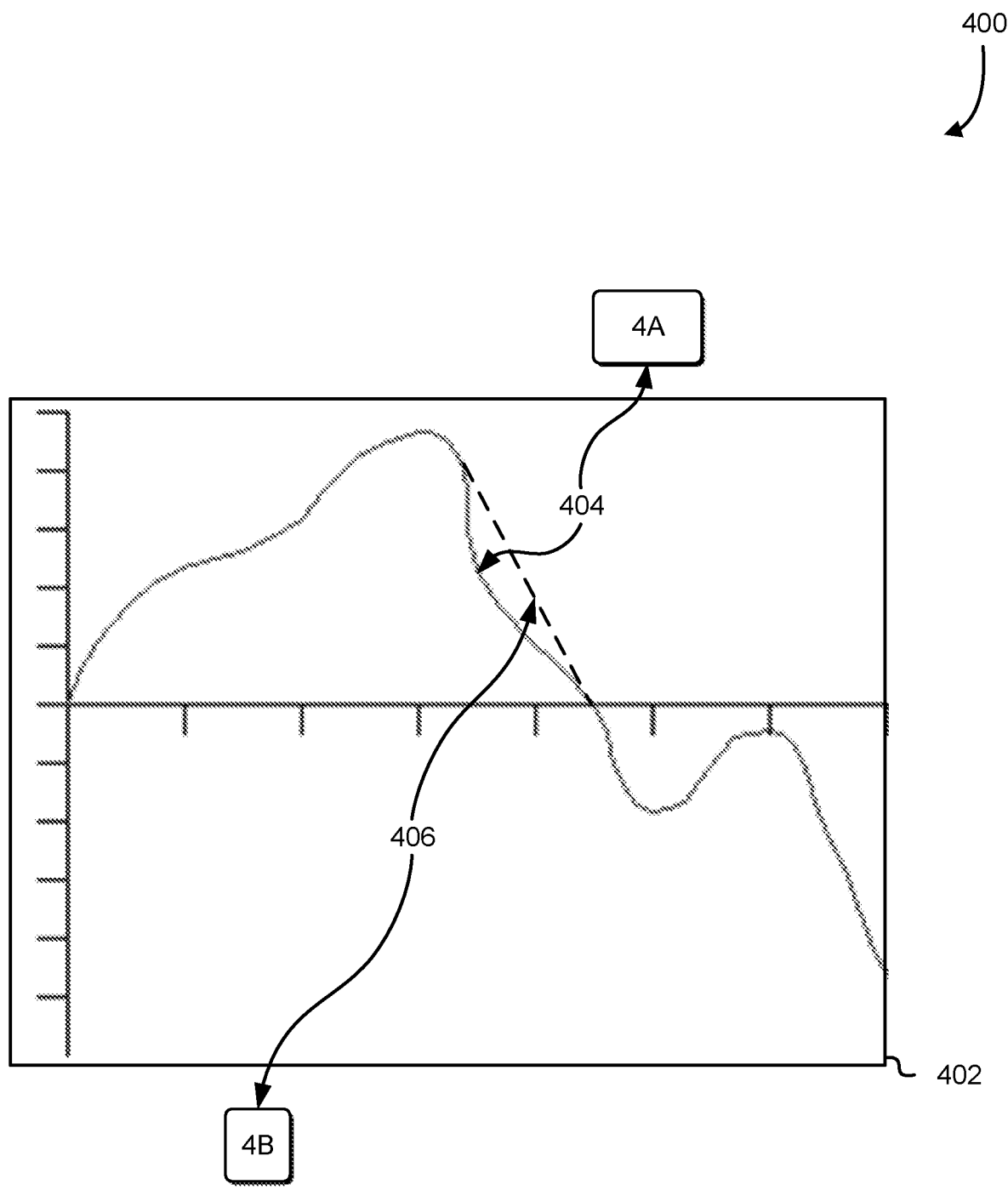
FIG. 4 shows an illustrative example of audio streams with loss protection, in accordance with at least one embodiment.

FIG. 4 illustrates an example diagram 400 of a restored stream 402, which may originate from audio streams with loss protection. The restored stream 402 may be the same or different as complete streams described in connection with FIG. 2. Specifically, FIG. 4 depicts, in an embodiment, the replacement of a specific portion/sample of a primary stream with an alternative portion/sample of a non-primary stream; audio streams with loss protection may comprise both a primary stream and one or more non-primary streams. In an embodiment, high-fidelity encoded sample 404 refers to a high-fidelity encoded sample originating from a plurality of samples from an audio source. The high-fidelity encoded sample 404 may be generated by utilizing high-fidelity audio codecs on a sample from a plurality of samples, and may be a part of a larger high-fidelity encoded plurality of samples, which may be denoted as a primary stream and/or first audio output stream. In some examples, the high-fidelity encoded sample 404 is the same or different as the sample denoted by "4A" in FIG. 1 and FIG. 2.

Additionally, the low-fidelity encoded sample 406 may be generated by utilizing low-fidelity compression audio codecs on the same sample from the same plurality of samples that the high-fidelity encoded sample 404 originates from. In some examples, the low-fidelity encoded sample 406 is the same or different as the sample denoted by "4B" in FIG. 1 and FIG. 2. The high-fidelity encoded sample 404, depicted as a block "4A" and as a section of a waveform, may be lost in the transmission of a high-fidelity encoded plurality of samples that may comprise the high-fidelity encoded sample 404. The transmission may utilize a wireless network, and utilize UDP to format the transmission; the transmission may comprise UDP datagrams. The UDP datagrams, which may comprise a stream of the high-fidelity encoded plurality of samples as well as other, lower-fidelity encodings of the plurality of samples, may be subject to stochastic loss as a result of their transmission; further information regarding stochastic loss can be found in the description of FIG. 2. This stochastic loss may result in the need for the replacement of lost samples with alternative non-primary samples.

The graph of the restored audio stream 402 depicts two overlaid samples; the high-fidelity encoded sample 404 and its replacement low-fidelity encoded sample 406. The graph demonstrates how the low-fidelity encoded sample 406, denoted by the dotted line, forms a close approximation of the high-fidelity encoded sample 404 (which may be lost in transmission), denoted by the solid line. The low-fidelity encoded sample 406 may present only an approximation of the high-fidelity encoded sample 404 due to its encoding; in various examples, the low-fidelity encoded sample 406 is a compressed version of the high-fidelity encoded sample 404 and may be no more than 10% of the size of the sample 404. In some examples, size may refer to the bandwidth utilized by a sample, which may be a part of a plurality of samples a stream comprises, in its transmission.

In an embodiment, the low-fidelity encoded sample 406 originates from the same plurality of samples that the high-fidelity encoded sample 404 originates from; this allows the low-fidelity encoded sample 406 to take the exact place of the missing high-fidelity encoded sample 404 without utilizing techniques such as interpolation, time shifting, transformations, and/or variations thereof because both samples 404 and 406 have the same timing, length, and/or other characteristics from the same plurality of samples. Therefore the low-fidelity encoded sample 406 may just be played back in place of the missing high-fidelity encoded sample 404 as its replacement. Additionally or alternatively, the low-fidelity encoded sample 406 may be stored and/or utilized in place of the missing high-fidelity encoded sample 404. Further information regarding the playback of a sample can be found in the description of FIG. 7.

Figure 5:
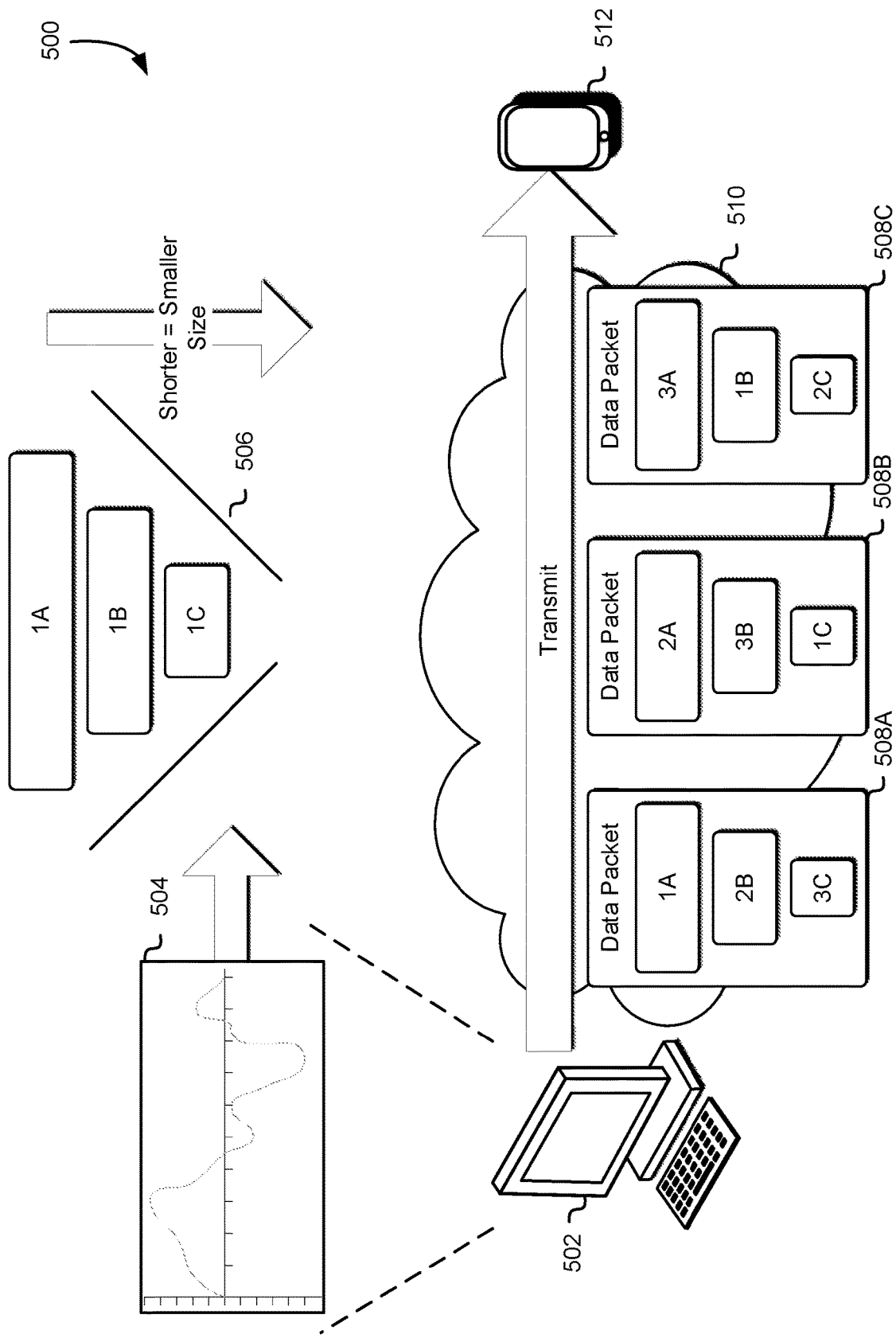
FIG. 5 shows an illustrative example for how various components in accordance with several embodiments may be implemented.

FIG. 5 illustrates an environment 500 in which various embodiments can be implemented. In environment 500, system 502 may be one or more computer systems configured with computer-executable instructions. The computer-executable instructions may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In various embodiments, system 502 is the same or different as the system. In some examples, the system 502 may be one or more instances of a physical computing instance, such as a physical server computer, or one or more instances of a virtual computing instance, such as a virtual machine, which may be hosted on one or more computer servers. The system 502 may also be a computing device, such as a mobile device, a personal computing device, an Internet-of-Things (IoT) computing device, and/or variations thereof. Other variations are also considered as being within the scope of the present disclosure.

In an embodiment, the system 502 obtains an audio source 504. The audio source 504 may be an analog or digital audio source, such as audio recorded from a microphone or headset. The system may obtain the audio source 504 by recording, processing, or detecting analog waveforms captured from a microphone or headset and converting the analog wave forms to a digital audio source using a digital-to-audio converter. In some examples, the audio source 504 may be audio captured using as part of an ongoing conversation of a telephone call, video call, voice over IP (VoIP) call, etc. Additionally, the audio source 504 may be a real-time audio stream, such as a television broadcast, radio broadcast, telephone call, and/or variations thereof. In some examples, the audio source 104 may be a multimedia source, and may contain various combinations of audio and video. The audio source 504 may originate from a system, such as the system 502, or alternatively from another system or systems. In an embodiment, the audio source 504 is the same or different as the audio source 104.

The system 502 may then generate a plurality of samples from the audio source 504. The system 502 may determine a sampling rate to dictate the rate at which the samples are to be captured from the audio source 504. In various embodiments, the sampling rate may range from 8,000 Hertz (samples per second) for audio such as telephone calls, 44,100 Hertz for audio such as recorded music, and 192,000 Hertz for high-fidelity audio. The sampling rate may also be determined based on other criteria, such as desired quality, desired size, and/or variations thereof. Following the determination of the sampling rate, the system 502 may sample the audio source 504 according to the sampling rate to identify a plurality of samples of the audio source. Further information regarding the sampling rate and plurality of samples can be found in the description of FIG. 1.

The plurality of samples may be utilized by the system 502 to create a plurality of encoded audio streams 506. In an embodiment, the system 502 encodes the plurality of samples in various ways to generate a plurality of encoded audio streams 506. It should be noted that in various embodiments an encoded audio stream comprises a plurality of encoded samples. In some examples, the system 502 may utilize encodings such as PCM (Pulse Code Modulation), FLAC (Free Lossless Audio Codec), MPEG-4 ALS (MPEG-4 Audio Lossless Coding), and/or variations thereof to generate a high-fidelity encoding of the plurality of samples; this encoding may be designated as the primary stream and may have a single sample be denoted by "1A".

Additionally or alternatively, the system 502 may further utilize other encodings such as ATRAC (Adaptive Transform Acoustic Coding), DTS (Dedicated To Sound) Coherent Acoustics, MPEG-4 Audio, and/or variations thereof to generate lower-fidelity/compressed encodings of the plurality of samples; these encodings may be designated as secondary or non-primary streams and may have single samples denoted by "1B" and "1C". In various embodiments, the secondary or non-primary streams are no more than 10% the size of the primary stream. The size of the stream may be a measure of the bandwidth utilized by the streams in their transmission; in this case the secondary or non-primary streams may utilize no more than 10% of the bandwidth utilized by the primary stream. Additionally, while FIG. 5 depicts only a single sample for each stream, the sample may be a part of a larger plurality of encoded samples forming a stream. For example, the plurality of encoded audio streams 506 depicts a single "1A" encoded sample. The single "1A" encoded sample may be a part of a larger plurality of samples, denoted by "2A", "3A" . . . etc. that form a single encoded audio stream.

As FIG. 5 depicts, the successive encodings of the plurality of samples may utilize increasingly compressive encoding techniques, therefore resulting in the generation of smaller sized streams. Additionally, in various embodiments, the data compression ratio of the low-fidelity/compressed streams (which may have single samples denoted by "1B" and "1C") that streams 506 comprises is inversely proportional to the rates of stochastic loss of a network 510. In an embodiment, the plurality of encoded audio streams 506 comprises a high-fidelity encoding stream, which has a single sample denoted as "1A", and two lower-fidelity encoding streams, which have single samples denoted as "1B" and "1C". Generally, it should be understood that unless explicitly contradicted or otherwise clear from context, the plurality of encoded audio streams 506 may comprise multiple streams in various combinations of high-fidelity and low-fidelity streams; there may be one or more high-fidelity streams and one or more low-fidelity streams.

The plurality of encoded audio streams 506 may then be transmitted to a system 512 via a network 510. The network 510 may be a wireless network used for transmitting data, and may be any appropriate network to transmit data, including an intranet, the Internet, a cellular network, a local area network, a satellite network, or any such network and/or combination. The network 510 may utilize the UDP (User Datagram Protocol) to transmit data in the form of packets. In various embodiments, the UDP is a transport layer protocol for communication that utilizes IP (Internet Protocol) packets to transmit data; the data may be contained in the form of datagrams.

The plurality of encoded audio streams 506 may be transmitted in the form of UDP datagrams 508A-08C, as described in the preceding paragraphs. In various embodiments, a single datagram contains various encodings of a single sample. The encodings may or may not be of the same sample. The format of the UDP datagrams 508A-08C may be structured to reduce loss caused by the network 510. In some examples, the loss in network 510 may be due to stochastic loss; the network 510 may be subject to a stochastic loss of at least 10% and not exceeding 20%. Further information regarding stochastic loss can be found in the description of FIG. 2. For example, data packet 508A comprises samples "1A", "2B", and "3C". Data packet 508B comprises samples "2A", "3B", and "1C". Therefore if data packet 508B is lost due to stochastic loss, data packet 508A still has sample "2B" which may be utilized as a replacement for the sample "2A" lost in data packet 508B.

The UDP datagrams 508A-08C may then be transmitted through the network 510 to a system 512 for further processing. In some examples, the system 512 may be a system like the system 502; the system 512 may also be the same or different system as the system. The system 512 may be one or more computer systems configured with computer-executable instructions. The computer-executable instructions may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some examples, the system 512 may be one or more instances of a physical computing instance, such as a physical server computer, or one or more instances of a virtual computing instance, such as a virtual machine, which may be hosted on one or more computer servers. The system 512 may also be a computing device, such as a mobile device, a personal computing device, an Internet-of-Things (IoT) computing device, and/or variations thereof. Other variations are also considered as being within the scope of the present disclosure. The system 512 may process the transmission in a manner described in FIG. 2.

Figure 6:
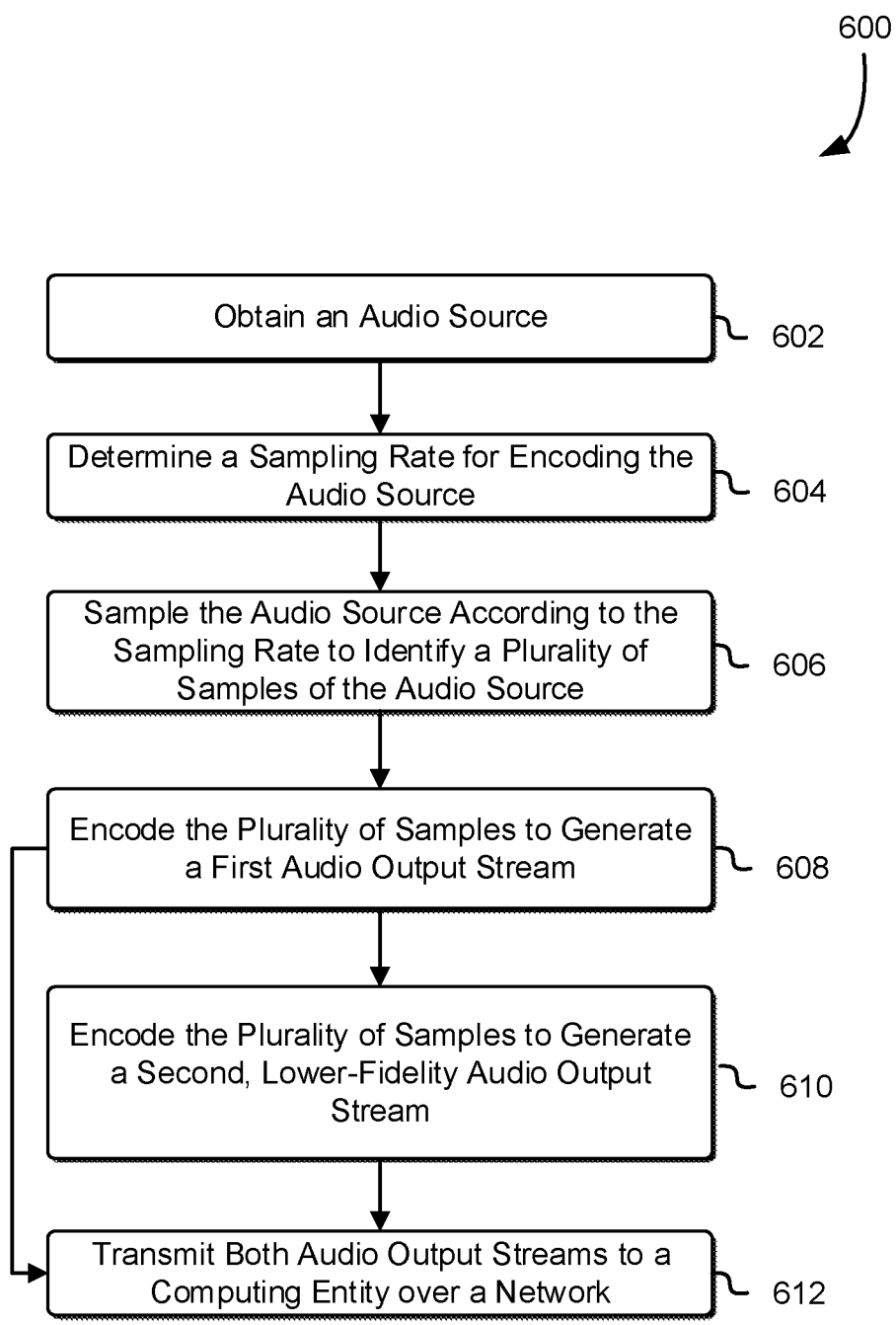
FIG. 6 shows a diagram illustrating a process for a system to generate and transmit audio streams with loss protection, in accordance with at least one embodiment.

FIG. 6 shows an illustrative example of a process 600 for loss protection of audio streams in accordance with an embodiment. Some or all of the process 600 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 600 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 600 may be implemented using any suitable computing entity such as the system described in connection with FIG. 1, one or more of the systems described in connection with FIG. 8, and more.

The system performing the process 600, in an embodiment, obtains 602 an audio source. The audio source may be an analog or digital audio source, such as audio recorded from a microphone or headset. The system may obtain the audio source by recording, processing, or detecting analog waveforms captured from a microphone or headset and converting the analog wave forms to a digital audio source using a digital-to-audio converter. For example, if the system performing the process is a mobile device such as a smartphone, the audio obtained by the system may be captured using a built-in microphone of the mobile device as part of a telephone call, video call, voice over IP (VoIP) call, etc. wherein the audio source is transmitted to a counterparty of the call as part of an ongoing conversation. Additionally, the audio source may be a real-time stream, such as a television broadcast, radio broadcast, telephone call, and/or variations thereof. In some examples, the audio source may be a multimedia source, and may contain various combinations of audio and video. In an embodiment, the audio source is the same as or different from audio sources described elsewhere in this disclosure, such as those discussed in connection with FIGS. 1 and 5. Further information regarding the audio source can be found in the description of FIG. 1.

Following the obtainment of the audio source, the system may determine 604 a sampling rate for encoding the audio source. In some examples, the sampling rate may determine the rate at which samples or values of the audio source are captured; the samples captured may be used to construct a discrete representation of the audio source. In various embodiments, the sampling rate may range from 8,000 Hertz (samples per second) for audio such as telephone calls, 44,100 Hertz for audio such as recorded music, and 192,000 Hertz for high-fidelity audio. The sampling rate may also be determined based on other criteria, such as desired quality, desired size, and/or variations thereof.

Following the determination of the sampling rate, the system may sample 606 the audio source according to the sampling rate to identify a plurality of samples of the audio source. In some examples, sampling may entail a process in which the system may capture samples or values of the audio source at rate determined by the sampling rate. The samples captured may form a plurality of samples; the plurality of samples may form a discrete representation of the audio source. In some examples, the plurality of samples may form a high-fidelity discrete representation of the audio source; the fidelity of the representation may be dependent on the sampling rate chosen for the audio source. In an embodiment, a higher sampling rate results in more samples taken, resulting in a higher-fidelity representation of the audio source. The number of samples within the plurality of samples may correspond directly to the number of samples taken at the sampling rate determined earlier.

The system may utilize the plurality of samples to generate one or more audio output streams. In an embodiment, the system encodes 608 the plurality of samples to generate a first audio output stream. In some examples, the system may utilize a high-fidelity audio codec, such as PCM (Pulse Code Modulation), FLAC (Free Lossless Audio Codec), MPEG-4 ALS (MPEG-4 Audio Lossless Coding), and/or variations thereof, to generate the first audio output stream. The system may generate the first audio output stream by encoding each sample of the plurality of samples; the first audio output stream may comprise the encoded plurality of samples. The first audio output stream may also be denoted as the primary stream.

Additionally, the system may encode 610 the plurality of samples to collectively generate a second audio output stream. The second audio output stream may be generated without re-sampling, such as in embodiments where the plurality of samples determined based on the sampling rate are cached or otherwise retained such that they are retrieval during this step of the process. In some cases, the second audio output stream may be generated in parallel with the first audio output stream. In some examples, the system may utilize an audio codec, which may be a low-fidelity compression algorithm such as ATRAC (Adaptive Transform Acoustic Coding), DTS (Dedicated To Sound) Coherent Acoustics, MPEG-4 Audio, and/or variations thereof, to generate the second audio output stream. The system may generate the second audio output stream by encoding each sample of the plurality of samples; the second audio output stream may comprise the encoded plurality of samples. The second audio output stream may also be denoted as a non-primary stream and/or secondary stream. In some examples, the system may generate multiple secondary audio output streams in the same manner as described previously; other variations are also considered as being within the scope of the present disclosure. In some examples, the size of the second audio output stream is no more than 10% of the size of the first audio output stream. The size of the stream may be a measure of the bandwidth utilized by the streams in their transmission; in this case the second audio output stream may utilize no more than 10% of the bandwidth utilized by the first audio output stream. Additionally or alternatively, size may refer to a measure of bits that a stream may occupy, and/or variations thereof.

The system may then transmit 612 both audio output streams to a computing entity over a network. The network may be a wireless network used for transmitting data, and may be any appropriate network to transmit data, including an intranet, the Internet, a cellular network, a local area network, a satellite network, or any such network and/or combination. The network may utilize the UDP (User Datagram Protocol) to transmit data in the form of packets. In various embodiments, the UDP is a transport layer protocol for communication that utilizes IP (Internet Protocol) packets to transmit data; the data may be contained in the form of datagrams. The first audio output stream and the second audio output stream may be encoded in a plurality of datagrams and may be transmitted over a network; in some examples, a single datagram corresponds to encodings of a single sample of the audio source. Further information regarding the transmission of the audio streams can be found in the description of FIG. 5. The computing entity may then receive and process the audio output streams. In some examples, the processing of the audio streams may be done through processes described in connection with FIG. 7.

Figure 7:
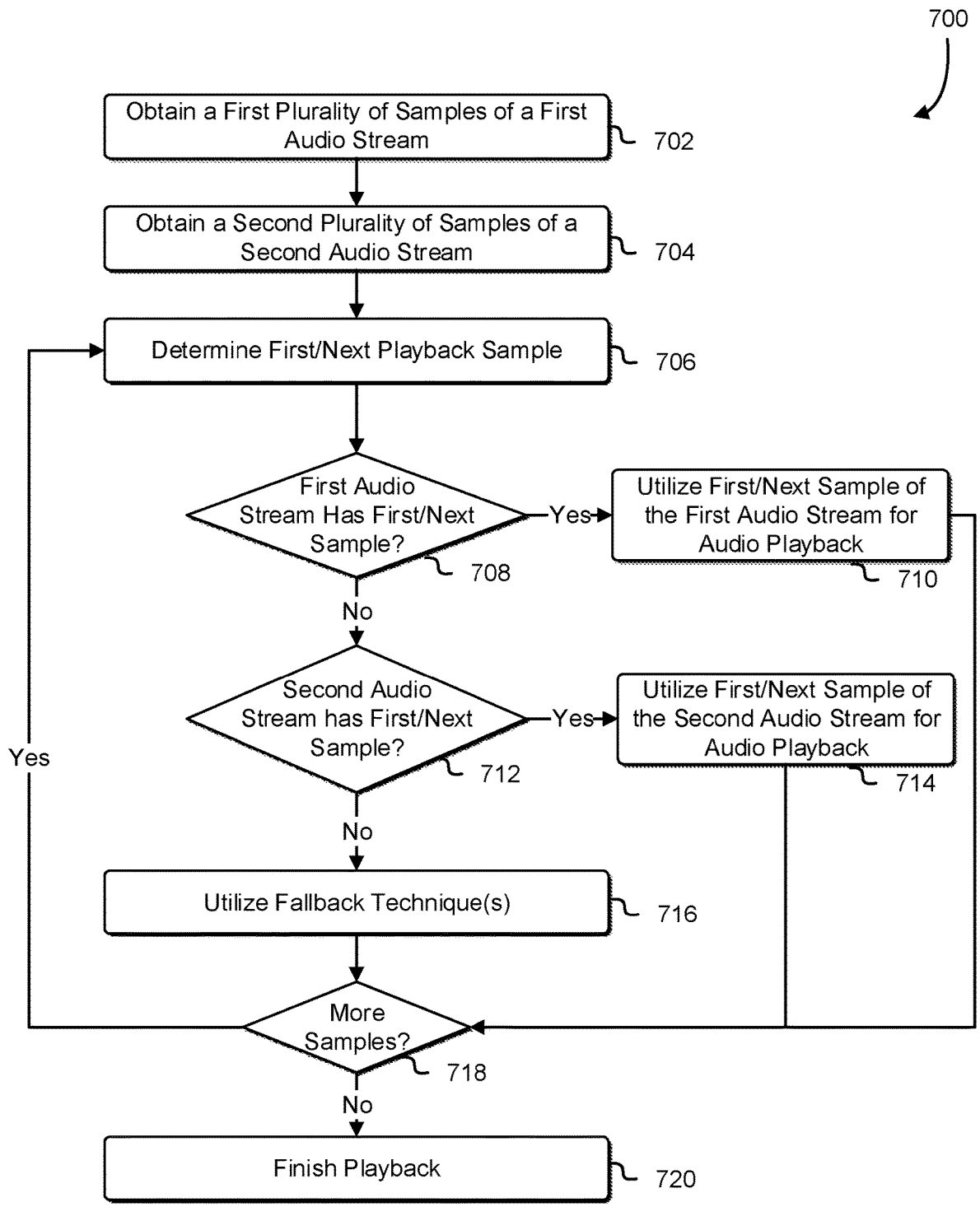
FIG. 7 shows a diagram illustrating a process for a system to receive and process audio streams with loss protection, in accordance with at least one embodiment.

FIG. 7 shows an illustrative example of a process 700 for loss protection of audio streams in accordance with an embodiment. Some or all of the process 700 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 700 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 700 may be implemented using any suitable computing entity such as a computer system described in connection with FIG. 1, one or more of the systems described in connection with FIG. 8, and more.

The system performing the process 700, in an embodiment, obtains 702 a first plurality of samples of a first audio stream. Additionally, the system may obtain 704 a second plurality of samples of a second audio stream. In some examples, the first audio stream and second audio stream may be the first audio output stream and second audio output stream, respectively, generated in accordance with processes described in connection with FIG. 6. Additionally, the first audio output stream may be a high-fidelity encoding of a plurality of samples from an audio source; the second audio output stream may be a low-fidelity/compression encoding of the same plurality of samples the first audio output stream originates from. The system may obtain the first audio stream and second audio stream from a network transmission. The network may be the same or different as the network utilized in process 600 for transmission of both audio output streams.

The network may be a wireless network used for transmitting data, and may be any appropriate network to transmit data, including an intranet, the Internet, a cellular network, a local area network, a satellite network, or any such network and/or combination. The network may utilize the UDP (User Datagram Protocol) to transmit data in the form of packets. In various embodiments, the UDP is a transport layer protocol for communication that utilizes IP (Internet Protocol) packets to transmit data; the data may be contained in the form of datagrams. The first audio stream and second audio stream may be encoded in a plurality of datagrams and may be transmitted over a network; in some examples, a single datagram corresponds to encodings of a single sample of the audio source. Further information regarding the transmission of the audio streams can be found in the description of FIG. 5.

The system may determine 706 first/next playback sample from the first and second pluralities of samples. In some examples, this may entail the system determining which sample to playback based on characteristics of the sample. In an embodiment, the first sample determined to be played back is the first sample from the first plurality of samples of the first audio stream. Additionally, in an embodiment, the next sample determined to be played is the next sample, chronologically after the previous sample determined to be played, from the first plurality of samples of the first audio stream. The samples may be an ordered set, in which the system may determine the sample based on the ordering of the samples. For example, a sample may have been played back, and may have been denoted as the second sample. The next sample determined to be played back may then be the next sample in chronological order; in this case the third sample would be determined to be played back next.

Following the determination of the first/next sample, the system may determine whether 708 the first audio stream has the determined first/next sample. In an embodiment, the system, using the determination of the first/next sample to be played, checks the first plurality of samples, of which the first audio stream comprises, to determine if it comprises the first/next sample. If the sample is present in the first audio stream, the system may utilize 710 the first/next sample of the first audio stream, for audio playback. This may entail the system audibly playing back the determined sample through one or more audio devices, such as an external speaker. Additionally or alternatively, the system may store, in one or more locations such as a data storage device, the determined sample for further processing (e.g., such as storing the determined sample in a file to be utilized and/or played back). After the playback is completed, the system may then determine if there are more 718 samples to be played back. In some examples, the system may determine this by checking if any samples remain in the first and second pluralities of samples. If no samples remain, the system may finish 720 playback and cease processing the first and second pluralities of samples, as no samples remain to be played and/or utilized.

If the first audio stream does not have the first/next sample, the system may check if the second audio stream has 712 first/next sample. In an embodiment, the system, using the determination of the first/next sample, checks the second plurality of samples, of which the second audio stream comprises, to determine if it comprises the first/next sample. If the sample is present in the second audio stream, the system may utilize 714 the first/next sample of the second audio stream for audio playback; audio playback may be done as described in the preceding paragraph. After the playback is completed, the system may then determine if there are more 718 samples to be played back. In some examples, the system may determine this by checking if any samples remain in the first and second pluralities of samples. If no samples remain, the system may finish 720 playback and cease processing the pluralities of samples.

If the second audio stream does not have the first/next sample, the system may then utilize 716 fallback techniques(s) to mitigate the loss of the sample. In some examples, the fallback techniques may generate a replacement for the lost sample, which may include utilizing interpolation between the samples before and after the missing sample to create an approximation to replace the missing sample, utilizing white noise to replace the missing sample, utilizing the previous sample to replace the missing sample, utilizing nothing to replace the missing sample, and/or variations thereof. Following the usage of the one or more fallback techniques to mitigate the loss of the sample, the system may determine if more 718 samples remain, and if so, repeat the process starting back at determining 706 first/next playback sample. If no samples remain, the system may finish 720 playback and cease processing the pluralities of samples.

As with all processes described herein, variations are considered as being within the scope of the present disclosure. For example, process 700 and process 600 may include additional operations not illustrated in FIG. 7 and FIG. 6, respectively; additionally, one or more of the operations performed in process 700 and process 600 may be performed in various orders and combinations, including in parallel.

Figure 8:
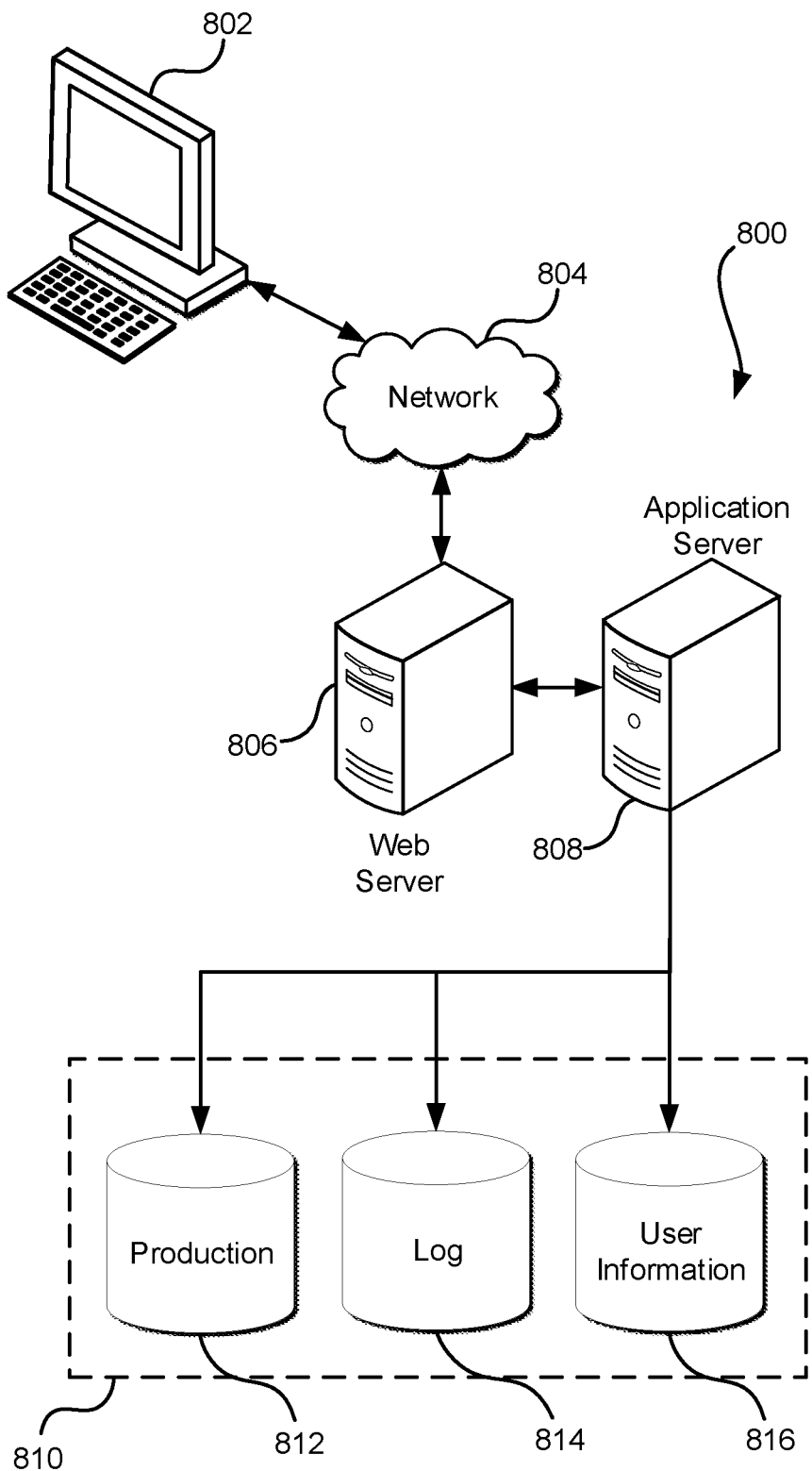
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (e.g., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implements an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining access to a real-time audio source;
determining a sampling rate for encoding the audio source;
sampling the audio source according to the sampling rate to identify a plurality of samples of the audio source;
encoding the plurality of samples to generate a first audio output stream;
encoding each sample of the plurality of samples to collectively generate a second audio output stream, wherein the fidelity of the second audio output stream is less than the fidelity of the first audio output stream; and
concurrently transmitting both the first audio output stream and the second audio output stream to a computing entity over a network according to a protocol wherein the computing entity, based on detecting loss of a portion of the first audio output stream, is able to utilize one or more samples of the second audio output stream in place of the portion of the first audio output stream.

2. The computer-implemented method of claim 1, wherein compressing each sample of the plurality of samples comprises using a lossy compression algorithm to compress each sample of the plurality of samples.

3. The computer-implemented method of claim 1, wherein transmitting both the first audio output stream and the second audio output stream to the computing entity over the network comprises transmitting a plurality of messages that collectively encodes both the first audio output stream and the second audio output stream over the network, wherein the plurality of messages transmitted over the network are subject to stochastic loss.

4. The computer-implemented method of claim 1, wherein the first audio output stream is encoded using a lossless encoding and the second audio output stream is encoded using a lossy encoding.

5. A system, comprising:
one or more processors; and
memory that stores computer-executable instructions that, as a result of execution, cause the one or more processors to:
obtain, from a real-time audio input, a plurality of samples of the audio input;
generate a first audio output of the audio input based on the plurality of samples of the audio input;
generate a second audio output by at least compressing each of the plurality of samples, wherein the second audio output is encoded with greater space efficiency than the first audio output; and
transmit both the first audio output and the second audio output to a computing entity over a network such that loss of a portion of the first audio output can be mitigated by a corresponding portion of the second audio output.

6. The system of claim 5, wherein the loss of the portion of the first audio output can be mitigated by the corresponding portion of the second audio output by at least:
determining one or more samples of the first audio output that were lost;
for each of the determined one or more samples of the first audio output that were lost, determining a respective sample of the second audio output; and
playing the respective samples in place of the one or more samples that were lost.

7. The system of claim 5, wherein the instructions to transmit both the first audio output and the second audio output to the computing entity over the network include instructions that, if executed, further cause the one or more processors to transmit a plurality of User Datagram Protocol (UDP) datagrams over the network, the plurality of UDP datagrams collectively encoding both the first audio output and the second audio output.

8. The system of claim 5, wherein fidelity of the second audio stream is based at least in part on a rate of stochastic loss associated with the network.

9. The system of claim 5, wherein the network is a wireless network subject to stochastic loss.

10. The system of claim 5, wherein the first audio output is generated using a lossless encoding and the second audio output is generated using a lossy encoding.

11. The system of claim 5, wherein the instructions to generate the second audio output by at least compressing each of the plurality of samples includes instructions that, if executed, further cause the one or more processors to compress each of the plurality of samples using a Dedicated To Sound (DTS) compression algorithm.

12. The system of claim 5, wherein the audio input is a voice input.

13. The system of claim 5, wherein:
the instructions further comprise instructions that, if executed, cause the one or more processors to determine an estimated rate of stochastic loss; and
the instructions to generate the second audio output by at least compressing each of the plurality of samples include instructions that, if executed, further cause the one or more processors to compress each of the plurality of samples according to a data compression ratio determined based on the estimated rate of stochastic loss, wherein the data compression ratio is inversely proportional to the estimated rate of stochastic loss.

14. A non-transitory computer-readable storage medium comprising executable instructions that, as a result of being executed by one or more processors of a computer system, cause the computer system to at least:
- receive a portion of a first audio stream generated based on a plurality of samples of an audio source;
- receive at least a portion of a second audio stream of the audio source, the second audio stream generated according to the plurality of samples and by at least encoding the plurality of samples with lower fidelity than the first audio stream;
- detect a lost portion of the first audio stream; and
- as a result of detecting the lost portion of the first audio stream, utilize a corresponding portion of the second audio stream in place of the lost portion of the first audio stream.

15. The non-transitory computer-readable storage medium of claim 14, wherein second audio stream is generated by at least compressing each sample of the plurality of samples without re-sampling.

16. The non-transitory computer-readable storage medium of claim 14, wherein the instructions further comprise instructions that, as a result of being executed by the one or more processors, cause the computer system to:
- obtain at least a portion of a third audio stream of the audio source, the third audio stream generated according to the plurality of samples and by at least compressing each sample of the plurality of samples, wherein the third audio stream has a larger data compression ratio than that of the second audio stream; and
- utilize a portion of the third audio stream to replace the lost portion of the first audio stream as a result of determining the corresponding portion of the first audio stream and the second audio stream were both lost.

17. The non-transitory computer-readable storage medium of claim 14, wherein the audio source is music.

18. The non-transitory computer-readable storage medium of claim 14, wherein the audio source is a real-time audio stream.

19. The non-transitory computer-readable storage medium of claim 14, wherein the computer system is an Internet-of-Things (IoT) device.

20. The non-transitory computer-readable storage medium of claim 14, wherein the first and second audio streams are generated in parallel.

* * * * *